US012620877B2

(12) United States Patent　　　　　(10) Patent No.:　US 12,620,877 B2
Chowdhury et al.　　　　　　　　　　　(45) Date of Patent:　　　May 5, 2026

(54) PROPULSION SYSTEM WITH DUAL-WOUND ELECTRIC MOTOR AND DUAL INVERTER CONFIGURATION

(71) Applicant: GM GLOBAL TECHNOLOGY OPERATIONS LLC, Detroit, MI (US)

(72) Inventors: Mazharul Chowdhury, Canton, MI (US); Mohammad F. Momen, Rochester Hills, MI (US); Khorshed Mohammed Alam, Canton, MI (US); Alexander Forsyth, Windsor (CA); Yilun Luo, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 391 days.

(21) Appl. No.: 18/481,708

(22) Filed: Oct. 5, 2023

(65) Prior Publication Data

US 2025/0119033 A1　　Apr. 10, 2025

(51) Int. Cl.
*H02K 11/33*　　　(2016.01)
*B60L 15/00*　　　(2006.01)
(Continued)

(52) U.S. Cl.
CPC ............ *H02K 11/33* (2016.01); *B60L 15/007* (2013.01); *H02K 1/16* (2013.01); *H02K 3/48* (2013.01); *H02K 15/085* (2013.01); *H02P 27/06* (2013.01)

(58) Field of Classification Search
CPC . H02K 11/33; H02K 1/16; H02K 3/48; H02K 15/085; H02K 3/12; H02K 3/28; B60L 15/007; H02P 27/06
(Continued)

(56) References Cited

U.S. PATENT DOCUMENTS

2009/0026895 A1 * 1/2009 Chakrabarti ........... H02K 11/33
　　　　　　　　　　　　　　　　　　310/198
2018/0367005 A1 * 12/2018 Rahman ................... H02K 3/12
(Continued)

FOREIGN PATENT DOCUMENTS

DE　　　102013202909 A1　　8/2014
WO　　WO-2014132385 A1 *　9/2014　............... H02K 3/28

OTHER PUBLICATIONS

Viju, Arun, Pramanic; Novel Symmetric Six-Phase Induction Motor Drive Using Stacked Multilevel Inverters With a Single DC Link and Neutral Point Voltage Balancing; IEEE Transactions on Industrial Electronics, vol. 64, 2017, Nr. 4, S. 2663-2670.

*Primary Examiner* — Ahmed Elnakib
(74) *Attorney, Agent, or Firm* — Quinn IP Law

(57)　　　　　ABSTRACT

A propulsion system for a vehicle includes an electric motor configured to generate torque to propel the vehicle. The electric motor has a stator assembly with a plurality of stator slots defining slot layers along a respective slot axis. A first plurality of conductors is at least partially positioned in the plurality of stator slots and forming a first winding set. A second plurality of conductors is at least partially positioned in the plurality of stator slots and forms a second winding set. A first inverter is adapted to drive the electric motor, the first winding set being coupled to the first inverter. A second inverter is adapted to drive the electric motor, the second winding set being coupled to the second inverter. The system includes a controller adapted to control operation of the first and second inverters based in part on a motor speed of the electric motor.

20 Claims, 6 Drawing Sheets

(51) Int. Cl.
    *H02K 1/16*         (2006.01)
    *H02K 3/48*         (2006.01)
    *H02K 15/085*     (2006.01)
    *H02P 27/06*      (2006.01)

(58) Field of Classification Search
    USPC ....................................................... 310/68 D
    See application file for complete search history.

(56) References Cited

U.S. PATENT DOCUMENTS

| | | | |
|---|---|---|---|
| 2019/0356260 A1* | 11/2019 | Severson | H02P 25/22 |
| 2020/0014266 A1* | 1/2020 | Oechslen | H02K 9/197 |
| 2020/0295611 A1 | 9/2020 | Husain et al. | |
| 2020/0373801 A1* | 11/2020 | Kinjo | H02M 7/493 |
| 2022/0149687 A1* | 5/2022 | Watanabe | H02K 3/28 |
| 2023/0130278 A1 | 4/2023 | Huh et al. | |
| 2023/0179137 A1* | 6/2023 | Faedo | H02P 27/08 |
| | | | 318/490 |
| 2025/0119002 A1* | 4/2025 | Momen | H02K 7/006 |
| 2025/0119033 A1* | 4/2025 | Chowdhury | H02K 3/12 |
| 2025/0183833 A1* | 6/2025 | Peng | B60L 53/24 |
| 2025/0266778 A1* | 8/2025 | Peng | H02P 21/22 |

* cited by examiner

PROPULSION SYSTEM WITH DUAL-WOUND ELECTRIC MOTOR AND DUAL INVERTER CONFIGURATION

INTRODUCTION

The disclosure relates generally to a propulsion system for a vehicle having an electric motor. More particularly, the disclosure relates to a propulsion system having a dual-wound electric motor and dual inverter configuration. An electric machine typically includes a stator having a plurality of stator windings and a rotor rotatable within the stator. In a generator mode, the rotation of the rotor induces voltage in the stator winding, which powers an external load such as charging a battery pack. Alternately, if an electric current is passed through the stator windings, the energized coils cause the rotor to rotate, and the machine will perform as a motor. Winding loss in the stator windings in a permanent magnet motor may become a challenging issue at various operating speeds.

SUMMARY

Disclosed herein is a propulsion system for a vehicle having an electric motor. The electric motor includes a stator assembly with a plurality of stator slots defining slot layers along a respective slot axis. A first plurality of conductors is at least partially positioned in the plurality of stator slots and forms a first winding set. A second plurality of conductors is at least partially positioned in the plurality of stator slots and forms a second winding set. The propulsion system includes a first inverter adapted to drive the electric motor, the first winding set being coupled to the first inverter. A second inverter is adapted to drive the electric motor, the second winding set being coupled to the second inverter. The system includes a controller having a processor and tangible, non-transitory memory on which instructions are recorded. The controller is adapted to control operation of the first inverter and the second inverter based in part on a motor speed of the electric motor.

In one embodiment, the first inverter and the second inverter are both three-level inverters. The first inverter is adapted to carry a first current, and the second inverter is adapted to carry a second current. Operation of the first inverter and the second inverter may be controlled such that: the first current is greater than the second current when the motor speed is above a predefined threshold; and the second current is greater than the first current when the motor speed is below the predefined threshold. The second current may be about 5% higher than the first current.

Each of the first plurality of conductors may be radially inwards relative to each of the second plurality of conductors along the respective slot axis such that the first plurality of conductors is closer to an air gap of the stator assembly. In a first embodiment, the first plurality of conductors extends a first conductor length along the respective slot axis and the second plurality of conductors extends a second conductor length along the slot axis, the first conductor length being smaller than the second conductor length. In a second embodiment, the first plurality of conductors and the second plurality of conductors define an equal conductor length.

In a third embodiment, the first plurality of conductors may be interleaved with the second plurality of conductors along the respective slot axis. Here, the first plurality of conductors extends a first conductor length along the respective slot axis and the second plurality of conductors extends a second conductor length along the slot axis, with the first conductor length being smaller than the second conductor length. Here, at least one of the second plurality of conductors may incorporate a split configuration having two equal conductor segments. In one example, the split configuration extends along a radial direction parallel to the respective slot axis. In another example, the split configuration extends along a circumferential direction perpendicular to the respective slot axis.

Disclosed herein is method of operating a propulsion system in a vehicle, the propulsion system having an electric motor configured to generate torque, and a controller having a processor and tangible, non-transitory memory. The method includes incorporating a stator assembly in the electric motor with a plurality of stator slots defining slot layers along a respective slot axis. The method includes forming a first winding set by positioning a first plurality of conductors in the plurality of stator slots, and forming a second winding set by positioning a second plurality of conductors in the plurality of stator slots. The method includes coupling the first winding set to a first inverter adapted to drive the electric motor, and coupling the second winding set to a second inverter adapted to drive the electric motor. Operation of the first inverter and the second inverter is controlled based in part on a motor speed of the electric motor, via the controller.

The method may include setting the first current to be greater than the second current when the motor speed is above a predefined threshold, via the controller; and setting the second current to be greater than the first current when the motor speed is below the predefined threshold, via the controller.

In one embodiment, the method includes positioning each of the first plurality of conductors to be radially inwards relative to each of the second plurality of conductors along the respective slot axis such that the first plurality of conductors is closer to an air gap of the stator assembly. The first plurality of conductors and the second plurality of conductors may define different conductor lengths. The first plurality of conductors and the second plurality of conductors may define equal conductor lengths.

In another embodiment, the method includes interleaving the first plurality of conductors with the second plurality of conductors along the respective slot axis. Here, the first plurality of conductors extends a first conductor length along the respective slot axis and the second plurality of conductors extends a second conductor length along the slot axis, with the first conductor length being smaller than the second conductor length. incorporating a split configuration in at least one of the second plurality of conductors, the split configuration being defined by two equal conductor segments.

Disclosed herein is a vehicle including an electric motor having a stator assembly with a plurality of stator slots defining slot layers along a respective slot axis. The electric motor is configured to generate torque for propulsion of the vehicle. A first plurality of conductors is at least partially positioned in the plurality of stator slots and forming a first winding set. A second plurality of conductors is at least partially positioned in the plurality of stator slots and forming a second winding set. A first inverter is adapted to drive the electric motor, the first winding set being coupled to the first inverter. A second inverter is adapted to drive the electric motor, the second winding set being coupled to the second inverter.

The vehicle includes a controller having a processor and tangible, non-transitory memory on which instructions are recorded. The controller is adapted to control operation of the first inverter and the second inverter based in part on a motor speed of the electric motor. The first inverter is adapted to carry a first current and the second inverter is adapted to carry a second current. Operation of the first inverter and the second inverter is controlled such that: the first current is greater than the second current when the motor speed is above a predefined threshold; and the second current is greater than the first current when the motor speed is above a predefined threshold.

The above features and advantages and other features and advantages of the present disclosure are readily apparent from the following detailed description of the best modes for carrying out the disclosure when taken in connection with the accompanying drawings.

Figure 1:
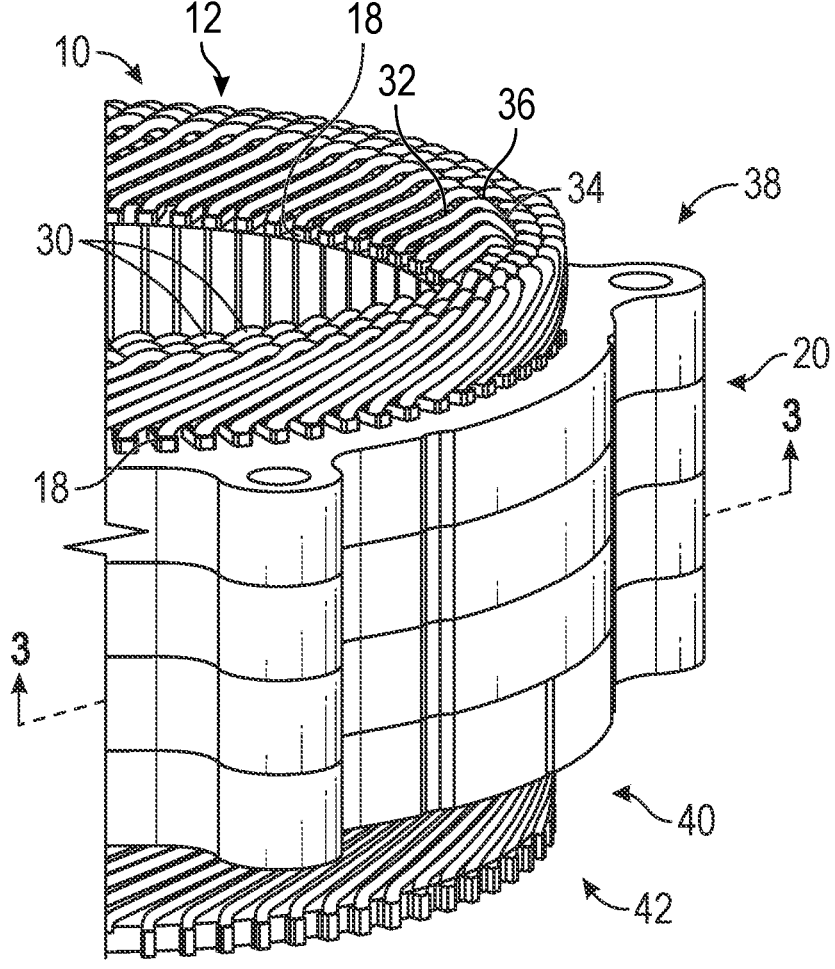
FIG. 1 is a schematic fragmentary perspective view of an electric motor/generator, referred to herein as electric motor, having a stator assembly.

Representative embodiments of this disclosure are shown by way of non-limiting example in the drawings and are described in additional detail below. It should be understood, however, that the novel aspects of this disclosure are not limited to the particular forms illustrated in the above-enumerated drawings. Rather, the disclosure is to cover modifications, equivalents, combinations, sub-combinations, permutations, groupings, and alternatives falling within the scope of this disclosure as encompassed, for instance, by the appended claims.

DETAILED DESCRIPTION

Referring to the drawings, wherein like reference numbers refer to like components, FIG. 1 is a schematic fragmentary perspective view of an electric motor/generator or electric traction machine, referred to herein as electric motor 10, having a stator assembly 12. The electric motor 10 is configured to generate an electric machine torque by, for example, converting electrical energy into rotational motion Referring to FIG. 2, the electric motor 10 may be part of a propulsion system 11 in a vehicle V. The vehicle V may be a mobile platform, such as, but not limited to, a passenger car, sport utility vehicle, light truck, heavy duty vehicle, ATV, minivan, bus, transit vehicle, bicycle, robot, farm implement, sports-related equipment, boat, plane, train or other device. The vehicle V may take many different forms and include multiple and/or alternate components and facilities.

Figure 2:
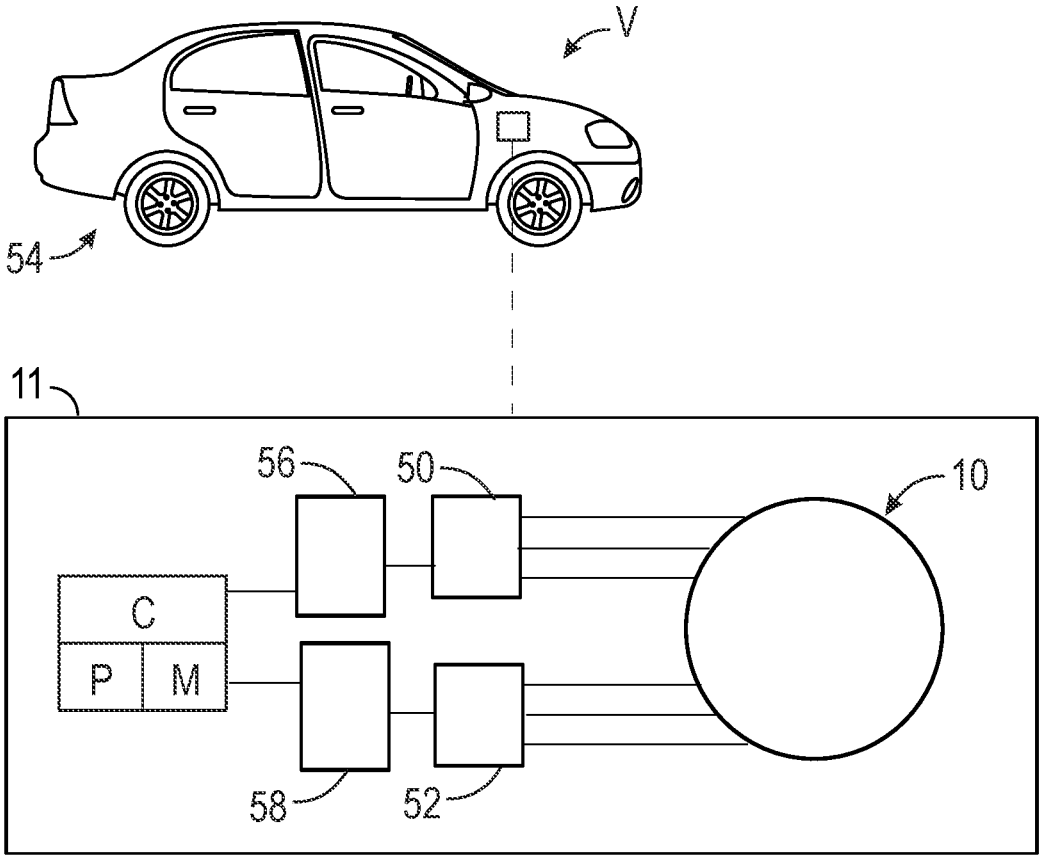
FIG. 2 is a schematic fragmentary diagram of a propulsion system for a vehicle incorporating the electric motor of FIG. 1.
Figure 3:
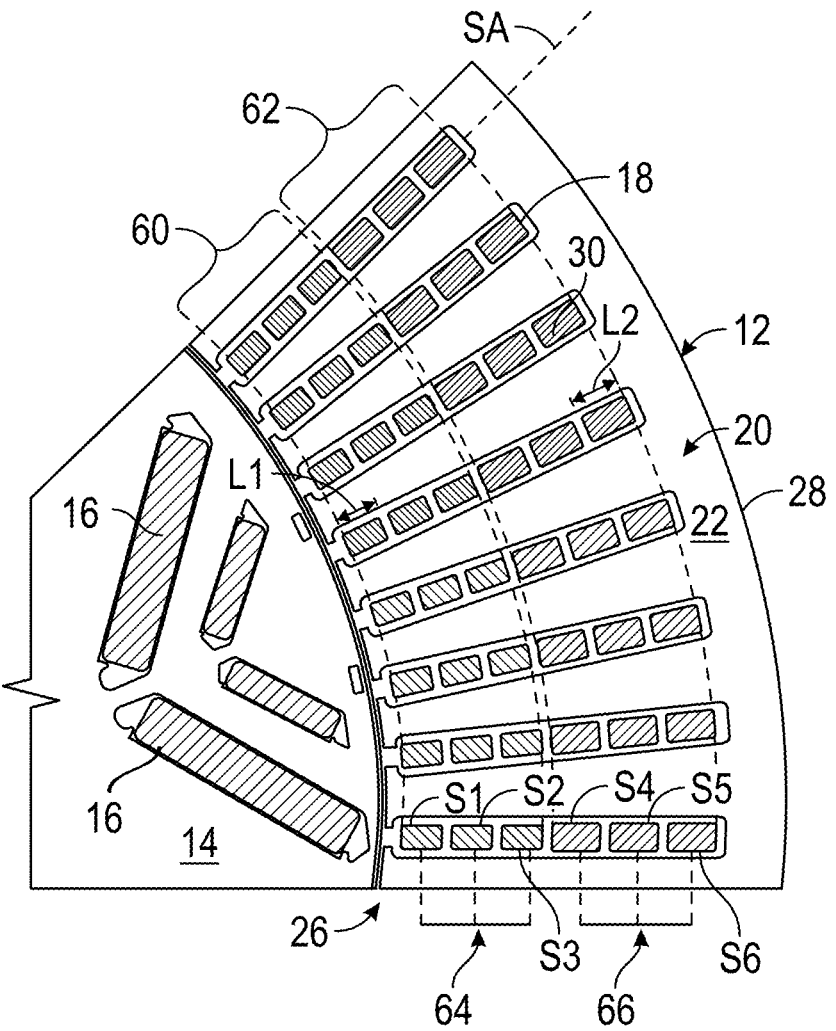
FIG. 3 is a schematic fragmentary partly sectional view through the stator assembly of FIG. 1, in accordance with a first embodiment.

FIG. 3 is a schematic fragmentary sectional view through axis 3-3 of the electric motor 10, in accordance with a first embodiment. Referring to FIG. 3, the electric motor 10 includes a rotor assembly 14, rotatable relative to and within the stator assembly 12. For clarity, the rotor assembly 14 is omitted in FIG. 1. The rotor assembly 14 may be annularly shaped and include one or more permanent magnets 16. Referring to FIG. 2, the rotor assembly 14 may include but is not limited to, an interior permanent magnet, a surface permanent magnet, an induction, synchronous, reluctance or a separately excited/wound-field rotor.

Referring to FIGS. 1 and 3, the stator assembly 12 includes a plurality of stator slots 18 ("plurality of" omitted henceforth) extending through a stator core 20. The number of slots and poles in the stator assembly 12 may be varied based on the application at hand. Referring to FIG. 1, the stator slots 18 may be evenly spaced from each other radially.

Referring to FIG. 3, the stator slots 18 define or are arranged in slot layers, such as first, second, third, fourth, fifth and sixth slot layers S1, S2, S3, S4, S5, and S6, along a respective slot axis SA. It should be appreciated that the stator slots 18 may include a different number of layers, including but not limited to, four layers or eight layers. The stator slots 18 may be partially open slots, fully open or closed slots. Referring to FIG. 3, the first slot layer S1 is closest to an air gap 26 of the stator assembly 12 and farthest from an outer diameter 28 of the stator core 20. The sixth slot layer S6 is closest to the outer diameter 28 and farthest from the air gap 26 of the stator assembly 12.

Referring to FIG. 1, the stator assembly 12 includes a plurality of conductors 30, which are segmented and include a respective first leg 32, a respective second leg 34 and a respective bent portion 36 sandwiched in between. The plurality of conductors 30 is configured to allow a current to flow from the respective first leg 32 to the respective second leg 34. As described below, the plurality of conductors 30 may incorporate various sizes. The plurality of conductors 30 may include small-stranded conductors, and bar-shaped or hairpin conductors. It is to be understood that the form and cross-sectional shape of the conductors may be varied based on the application at hand.

Referring to FIG. 2, the plurality of conductors 30 has their respective first leg 32 inserted into one of the multiple respective slot layers S1-S6 (see FIG. 3) and their respective second leg 34 inserted into another of the multiple respective slot layers S1-S6 (see FIG. 3). Slot liners (not shown) may be inserted into the stator slots 18 to electrically isolate the plurality of conductors 30 from one another and to the stator core to prevent phase to phase or phase to ground shorts from occurring.

Referring to FIG. 1, the plurality of conductors 30 extend through the stator slots 18 between a crown end 38 and a weld end 40. Referring to FIG. 1, the plurality of conductors 30 may be inserted into the stator slots 18 at the crown end 38. Once the plurality of conductors 30 is threaded through the stator slots 18, their respective distal portions 42 may be individually twisted at the weld end 40 (shown in FIG. 1) and connected to multi-phase alternating current windings. It is to be understood that the number of conductor layers may be varied based on the application at hand.

As described below, the propulsion system 11 has a dual-wound electric motor configuration along with a dual inverter configuration to optimize the current density across the stator slots 18. The plurality of conductors 30 form two winding sets within the stator slots 18 defining an identical number of multiple phases. In one embodiment, the number of multiple phases is exactly three, such as for example a "U" phase, a "V" phase and a "W" phase, respectively. In another embodiment, the number of multiple phases is five. However, the electric motor 10 is not limited to a three or five phase machine, and the number of phases may differ from the phases described herein.

The propulsion system 11 provides reduced motor copper loss at different operating speed regions, resulting in better thermal management and performance at high demanding drive-cycles. Referring to FIG. 2, the electric motor 10 may be configured to use alternating current ("AC") voltage from a plurality of inverters, including a first inverter 50 and a second inverter 52, to generate rotational motion subsequently transmitted to the wheels 54 of the vehicle V. In order to power the electric motor 10, direct current ("DC") power is provided from one or more energy sources (not shown) to the first and second inverters 50, 52, which convert the direct current power into alternating current power.

Referring to FIG. 2, the propulsion system 11 includes a controller C having a processor P and tangible, non-transitory memory M on which instructions are recorded. The controller C is adapted to control operation of the first inverter 50 and the second inverter 52 based in part on a motor speed of the electric motor 10. The controller C may employ high frequency pulse width modulators 56, 58 to modulate and control the first and second inverters 50, 52 respectively. In the embodiment shown, the first and second inverters 50, 52 each include six switches (e.g., semiconductor devices) arranged into three respective pairs.

Referring to FIG. 3, the electric motor 10 has a dual wound configuration with a first plurality of conductors 60 and a second plurality of conductors 62 being at least partially positioned in the stator slots 18. The term "at least partially positioned" is employed since some parts of the conductors extend outside the stator slots 18 (see FIG. 1). In the first embodiment shown in FIG. 3, each conductor in the first plurality of conductors 60 is radially inwards relative to each of the second plurality of conductors 62 along the respective slot axis SA such that the first plurality of conductors 60 is closer to the air gap 26 and farther from the outer diameter 28 of the stator assembly 12. In the embodiment shown, the first plurality of conductors 60 is in slot layers S1, S2, S3, while the second plurality of conductors 62 is in slot layers S4, S5, S6. The total number of conductors 30 in the stator assembly 12 are equally divided between the first plurality of conductors 60 and the second plurality of conductors 62.

Referring to FIG. 3, the first plurality of conductors 60 forms a first winding set 64 coupled to the first inverter 50 (see FIG. 2) such that the first inverter 50 produces alternating current voltage across the first winding set 64. The second plurality of conductors forms a second winding set 66 coupled to the second inverter 52 such that the second inverter 52 produces alternating current voltages across the second winding set 66.

Referring to FIG. 3, each conductor in the first plurality of conductors 60 extends a first conductor length L1 radially along the slot axis SA. Each conductor in the second plurality of conductors 62 extends a second conductor length L2 radially along the slot axis SA. The first conductor length L1 is smaller than the second conductor length L2, resulting in different cross sections. Similarly, for the same radial length, each conductor in the first plurality of conductors 60 can be narrower circumferentially than each conductor in the second plurality of conductors 62, resulting in different cross sections. In FIG. 3, both current and current density are different between the first plurality of conductors 60 and the second plurality of conductors 62. The relatively smaller conductors (in the first plurality of conductors 60) placed near the air gap 26 are fed with the lower-current first inverter 50, while the relatively larger conductors (in the second plurality of conductors 62) placed near the outer diameter 28 are fed from the higher-current second inverter 52. This configuration keeps the current densities similar across the stator slots 18, minimizing alternating current losses in the electric motor 10. Additionally, lower direct current loss with higher current operation is possible as the current density is low. In one example, about 40% to 60% of the slot area close to the air gap 26 may be populated with small-stranded conductors, and the remaining may include larger bar-shaped or hairpin conductors.

Figure 4:
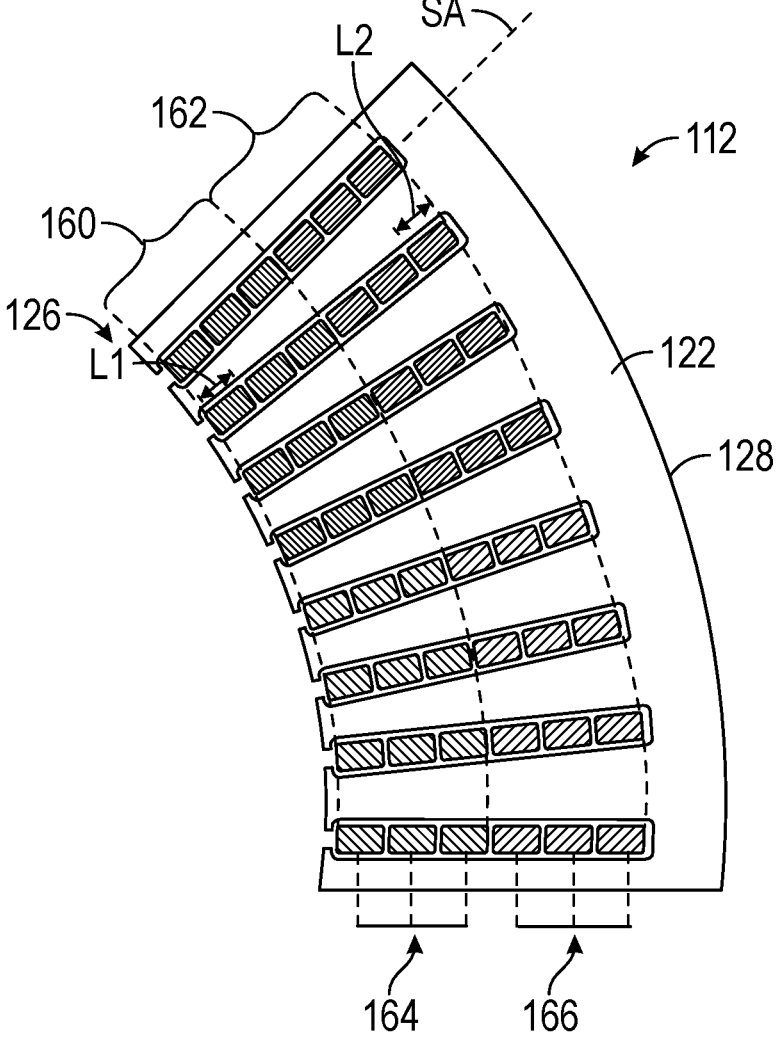
FIG. 4 is a schematic fragmentary partly sectional view through the stator assembly of FIG. 1, in accordance with a second embodiment.
Figure 5A:
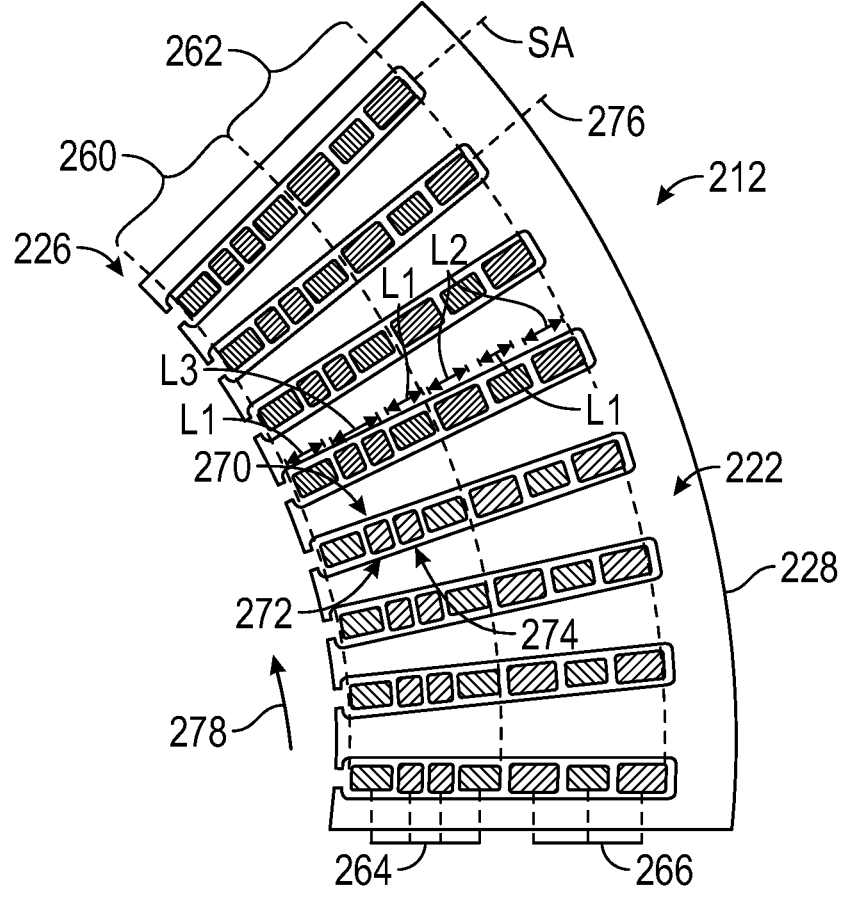
FIG. 5A is a schematic fragmentary partly sectional view through the stator assembly of FIG. 1, in accordance with a third embodiment.

Alternate embodiments of the electric motor 10 are shown in FIGS. 4 and 5A, and described below. Referring to FIG. 4, each of the first plurality of conductors 160 is radially inwards relative to each of the second plurality of conductors 162 along the respective slot axis SA such that the first plurality of conductors 160 is closer to the air gap 126 of the stator assembly 112 and farther from the outer diameter 128 of the stator core 122. The first plurality of conductors 160 forms a first winding set 164 coupled to the first inverter 50 (see FIG. 2) while the second plurality of conductors 162 forms a second winding set 166 coupled to the second inverter 52.

Referring to FIG. 4, the first and second plurality of conductors extend a first conductor length L1 and a second conductor length L2 along the respective slot axis SA. The second embodiment shown in FIG. 4 is similar to the first embodiment shown in FIG. 3 except that in FIG. 4, the first conductor length L1 and a second conductor length L2 are equal. The current and current density are the same across the first and second winding sets 164, 166. Here, there are higher alternating current (AC) losses in the conductors closer to the air gap 126 and lower direct current (DC) losses in the conductors farther from the air gap 126.

A third embodiment is shown in FIG. 5A. Referring to FIG. 5A, the first plurality of conductors 260 forms a first winding set 264 coupled to the first inverter 50 (see FIG. 2) while the second plurality of conductors 262 forms a second winding set 266 coupled to the second inverter 52. The first and second plurality of conductors 260, 262 respectively extend a first conductor length L1 and a second conductor length L2 along the respective slot axis SA. In this embodiment, the first conductor length L1 is smaller than the second conductor length L2. Here, both the current and current density are different between the first plurality of conductors and the second plurality of conductors.

In the embodiment shown in FIG. 5, the first plurality of conductors 260 is interleaved with the second plurality of conductors 262 along the respective slot axis SA. In other words, the first plurality of conductors 260 occupies the odd slot layers (first slot layer S1, the third slot layer S3, and the fifth slot layer S5) while the second plurality of conductors 262 occupies the even slot layers (second slot layer S2, the fourth slot layer S3, and the sixth slot layer S5). This configuration minimizes alternating current losses in the electric motor 10, allowing lower direct current losses with higher current operation.

Figure 5B:
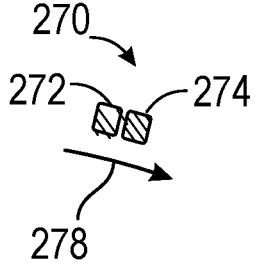
FIG. 5B is a schematic diagram illustrating an alternative split configuration for the assembly of FIG. 5A.

Referring to FIG. 5A, some of the conductors in the second plurality of conductors 260 may be in the form of a split configuration 270 having two equal conductor segments 272, 274. The split configuration 270 is located closer to the air gap 226, and farther from the outer diameter 228 of the stator core 222, compared to the non-split configuration. The split configuration 270 of the second plurality of conductors may extend along different directions. In one embodiment, shown in FIG. 5A, the split configuration 270 extends along a radial direction 276 parallel to the slot axis SA. Alternatively, as shown in FIG. 5B, the split configuration 270 (with two conductor segments 272, 274) may extend along a circumferential direction 278, which is perpendicular to the slot axis SA.

While fragmentary sectional views of the stator assembly 12, 112, 212 are shown in FIGS. 3-5A, it is understood that the first plurality of conductors 60, 160, 260 and the second plurality of conductors 62, 162, 262 respectively extend around the entirety (360 degrees) of the stator core 22, 122, 222.

Figure 6:
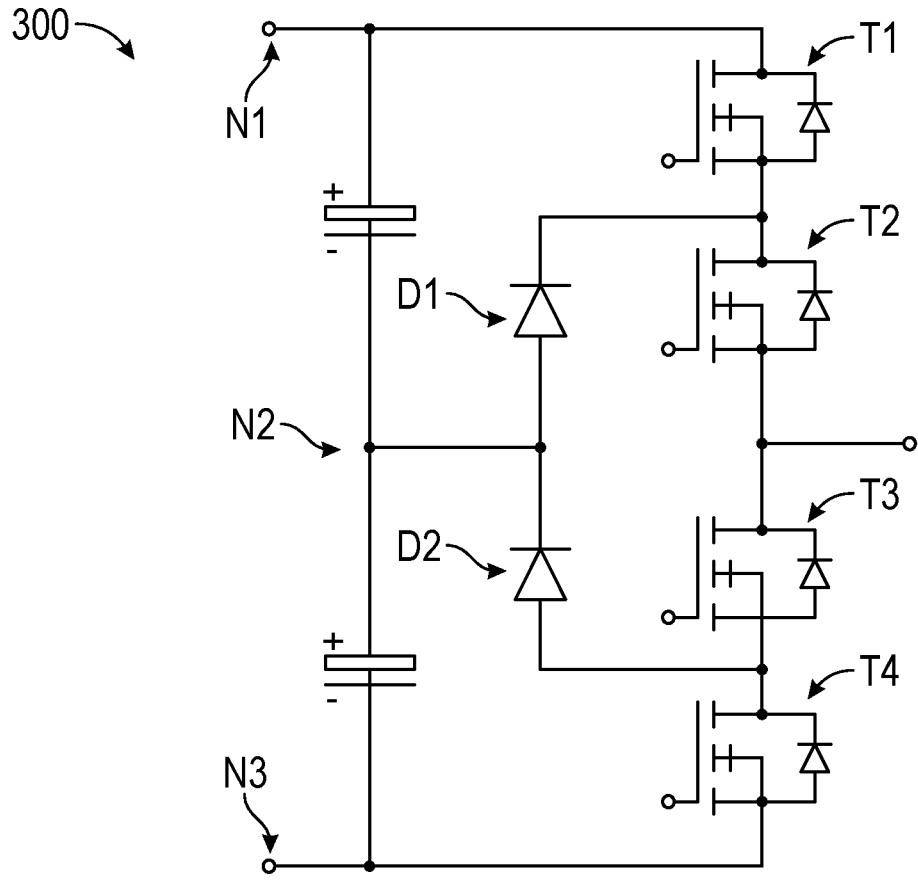
FIG. 6 is a schematic diagram of an example inverter architecture employable by the system of FIG. 1.

In one embodiment, the first inverter 50 and the second inverter 52 are both three-level inverters. The three-level inverter is adapted to generate three voltage levels on the output: the DC bus positive voltage, zero voltage and DC bus negative voltage. In another embodiment, the first inverter 50 is a two-level inverter, and the second inverter 52 is a three-level inverter. A two-level inverter connects the output to either the positive bus or the negative bus. Referring to FIG. 6, an example inverter phase leg or structure of an inverter 300 is shown. The inverter 300 is a three-level neutral-point-lamped (NPC) inverter employing clamping diodes (such as diode D1 and diode D2). Referring to FIG. 6, the three-level inverter is adapted to generate three voltage levels on the output nodes using different combinations of four transistors, T1, T2, T3 and T4. The three voltage levels include a DC bus positive voltage, zero voltage, and a DC bus negative voltage on the first, second, and third nodes N1, N2, N3, respectively.

In summary, the controller C is adapted to modulate or control operation of the first and second inverters 50, 52 such that the first current (i.e., the first plurality of conductors 60, 160, 260 carry relatively more current) is greater than the second current when the motor speed is above a predefined threshold, and the second current is greater than the first current (i.e., the second plurality of conductors 62, 162, 262 carry relatively more current) when the motor speed is below the predefined threshold. In one example, the second current is about 5% higher than the first current. The propulsion system 11 provides reduced motor copper loss at different operating speed regions, resulting in better thermal management and performance at high demanding drive-cycles.

The controller C of FIG. 2 includes a computer-readable medium (also referred to as a processor-readable medium), including a non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, other magnetic medium, a CD-ROM, DVD, other optical medium, a physical medium, a RAM, a PROM, an EPROM, a FLASH-EEPROM, other memory chip or cartridge, or other medium from which a computer can read.

Look-up tables, databases, data repositories or other data stores described herein may include various kinds of mechanisms for storing, accessing, and retrieving various kinds of data, including a hierarchical database, a set of files in a file storage system, an application database in a proprietary format, a relational database management system (RDBMS), etc. Each such data store may be included within a computing device employing a computer operating system such as one of those mentioned above and may be accessed via a network in one or more of a variety of manners. A file system may be accessible from a computer operating system and may include files stored in various formats. An RDBMS may employ the Structured Query Language (SQL) in addition to a language for creating, storing, editing, and executing stored procedures, such as the PL/SQL language mentioned above.

The numerical values of parameters (e.g., of quantities or conditions) in this specification, including the appended claims, are to be understood as being modified in each respective instance by the term "about" whether or not "about" actually appears before the numerical value. "About" indicates that the stated numerical value allows some slight imprecision (with some approach to exactness in the value; about or reasonably close to the value; nearly). If the imprecision provided by "about" is not otherwise understood in the art with this ordinary meaning, then "about" as used herein indicates at least variations that may arise from ordinary methods of measuring and using such parameters. In addition, disclosure of ranges includes disclosure of each value and further divided ranges within the entire range. Each value within a range and the endpoints of a range are hereby disclosed as separate embodiments.

The detailed description and the drawings or FIGS. are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings, or the characteristics of various embodiments mentioned in the present description, are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A propulsion system comprising:

an electric motor having a stator assembly with a plurality of stator slots defining slot layers along a respective slot axis;

a first plurality of conductors at least partially positioned in the plurality of stator slots, the first plurality of conductors forming a first winding set;

a second plurality of conductors at least partially positioned in the plurality of stator slots, the second plurality of conductors forming a second winding set;

a first inverter adapted to drive the electric motor, the first winding set being coupled to the first inverter;

a second inverter adapted to drive the electric motor, the second winding set being coupled to the second inverter;

a controller having a processor and tangible, non-transitory memory on which instructions are recorded, the controller being adapted to control operation of the first inverter and the second inverter based in part on a motor speed of the electric motor; and wherein:

the first plurality of conductors is interleaved with the second plurality of conductors along the respective slot axis;

the first plurality of conductors extends a first conductor length along the respective slot axis and the second plurality of conductors extends a second conductor length along the slot axis, the first conductor length being smaller than the second conductor length; and at least one of the second plurality of conductors incorporates a split configuration having two equal conductor segments.

2. The propulsion system of claim 1, wherein the first inverter and the second inverter are both three-level inverters.

3. The propulsion system of claim 1, wherein the first inverter is adapted to carry a first current, the second inverter is adapted to carry a second current, and operation of the first inverter and the second inverter is controlled such that:

the first current is greater than the second current when the motor speed is above a predefined threshold; and the second current is greater than the first current when the motor speed is below the predefined threshold.

4. The propulsion system of claim 3, wherein the second current is 5% higher than the first current.

5. The propulsion system of claim 1, wherein each of the first plurality of conductors is radially inwards relative to each of the second plurality of conductors along the respective slot axis such that the first plurality of conductors is closer to an air gap of the stator assembly.

6. The propulsion system of claim 1, wherein the split configuration extends along a radial direction parallel to the respective slot axis.

7. The propulsion system of claim 1, wherein the split configuration extends along a circumferential direction perpendicular to the respective slot axis.

8. A method of operating a propulsion system in a vehicle, the propulsion system having an electric motor configured to generate torque, and a controller having a processor and tangible, non-transitory memory, the method comprising:

incorporating a stator assembly in the electric motor with a plurality of stator slots defining slot layers along a respective slot axis;

forming a first winding set by positioning a first plurality of conductors in the plurality of stator slots;

forming a second winding set by positioning a second plurality of conductors in the plurality of stator slots;

coupling the first winding set to a first inverter adapted to drive the electric motor;

coupling the second winding set to a second inverter adapted to drive the electric motor; and controlling operation of the first inverter and the second inverter based in part on a motor speed of the electric motor, via the controller, including setting the first current to be greater than the second current when the motor speed is above a predefined threshold, and setting the second current to be greater than the first current when the motor speed is below the predefined threshold.

9. The method of claim 8, further comprising:

positioning each of the first plurality of conductors to be radially inwards relative to each of the second plurality of conductors along the respective slot axis such that the first plurality of conductors is closer to an air gap of the stator assembly, the first plurality of conductors and the second plurality of conductors defining different conductor lengths.

10. The method of claim 8, further comprising:

positioning each of the first plurality of conductors to be radially inwards relative to each of the second plurality of conductors along the respective slot axis such that the first plurality of conductors is closer to an air gap of the stator assembly, the first plurality of conductors and the second plurality of conductors defining an equal conductor length.

11. The method of claim 8, further comprising:

interleaving the first plurality of conductors with the second plurality of conductors along the respective slot axis, the first plurality of conductors extending a first conductor length along the respective slot axis and the second plurality of conductors extends a second conductor length along the slot axis, the first conductor length being smaller than the second conductor length; and incorporating a split configuration in at least one of the second plurality of conductors, the split configuration being defined by two equal conductor segments.

12. A vehicle comprising:

an electric motor having a stator assembly with a plurality of stator slots defining slot layers along a respective slot axis, the electric motor being configured to generate torque for propulsion;

a first plurality of conductors at least partially positioned in the plurality of stator slots and forming a first winding set;

a second plurality of conductors at least partially positioned in the plurality of stator slots and forming a second winding set;

a first inverter adapted to drive the electric motor, the first winding set being coupled to the first inverter;

a second inverter adapted to drive the electric motor, the second winding set being coupled to the second inverter; and a controller having a processor and tangible, non-transitory memory on which instructions are recorded, the controller being adapted to control operation of the first inverter and the second inverter based in part on a motor speed of the electric motor;

wherein the first inverter is adapted to carry a first current and the second inverter is adapted to carry a second current, operation of the first inverter and the second inverter being controlled such that:

the first current is greater than the second current when the motor speed is above a predefined threshold; and the second current is greater than the first current when the motor speed is above a predefined threshold.

13. The vehicle of claim 12, wherein:

each of the first plurality of conductors is radially inwards relative to each of the second plurality of conductors along the respective slot axis such that the first plurality of conductors is closer to an air gap of the stator assembly; and the first plurality of conductors and the second plurality of conductors define an equal conductor length.

14. The vehicle of claim 12, wherein:

each of the first plurality of conductors is radially inwards relative to each of the second plurality of conductors along the respective slot axis such that the first plurality of conductors is closer to an air gap of the stator assembly; and the first plurality of conductors extends a first conductor length along the respective slot axis and the second plurality of conductors extends a second conductor length along the slot axis, the first conductor length being smaller than the second conductor length.

15. The vehicle of claim 12, wherein:

the first plurality of conductors is interleaved with the second plurality of conductors along the respective slot axis;

the first plurality of conductors extends a first conductor length along the respective slot axis and the second plurality of conductors extends a second conductor length along the slot axis, the first conductor length being smaller than the second conductor length; and at least one of the second plurality of conductors incorporates a split configuration having two equal conductor segments.

16. The vehicle of claim 15, wherein the split configuration extends along a circumferential direction perpendicular to the respective slot axis.

17. The vehicle of claim 15, wherein the split configuration extends along a radial direction parallel to the respective slot axis.

18. The vehicle of claim 12, wherein the first inverter and the second inverter are both three-level inverters.

19. The vehicle of claim 12, wherein the second current is 5% higher than the first current.

20. The vehicle of claim 12, wherein the first plurality of conductors and the second plurality of conductors define an equal conductor length.

\*    \*    \*    \*    \*